United States Patent

Kimball

[11] 3,933,033
[45] Jan. 20, 1976

[54] CANTILEVER DRIVER BAR

[76] Inventor: David V. Kimball, 481 St. Augustine, Claremont, Calif. 91711

[22] Filed: May 20, 1974

[21] Appl. No.: 466,151

[52] U.S. Cl. ............... 73/71.6; 403/379; 403/388; 403/393
[51] Int. Cl.² ......................................... B06B 1/12
[58] Field of Search ............... 73/71.6, 67; 85/67; 403/379, 388, 393, 371, 337

[56] References Cited
UNITED STATES PATENTS

| | | | |
|---|---|---|---|
| 683,082 | 9/1901 | Summerer | 85/67 |
| 2,862,385 | 12/1958 | Woods | 73/71.6 |
| 2,920,498 | 1/1960 | Fedren | 403/388 X |
| 3,091,990 | 6/1963 | McVittle | 85/67 |
| 3,142,172 | 7/1964 | Taccogna | 73/71.6 |
| 3,208,270 | 9/1965 | Hill | 73/71.6 |
| 3,242,724 | 3/1966 | Ceparano et al. | 73/71.6 |
| 3,277,696 | 10/1966 | Gertel | 73/71.6 |

FOREIGN PATENTS OR APPLICATIONS 871,394 6/1961 United Kingdom ................. 73/71.6

*Primary Examiner*—Donald O. Woodiel
*Assistant Examiner*—Stephen A. Kreitman
*Attorney, Agent, or Firm*—Louis J. Bachand

[57] ABSTRACT

Vibration testing apparatus in which the driver bar interconnecting the slip plate and shaker head in vibration transmitting relation supports the slip plate more closely adjacent the shaker head and in cantilevered fashion, opposite the locus of free-sliding engagement of the slip plate and its support block, and free of such locus.

6 Claims, 6 Drawing Figures

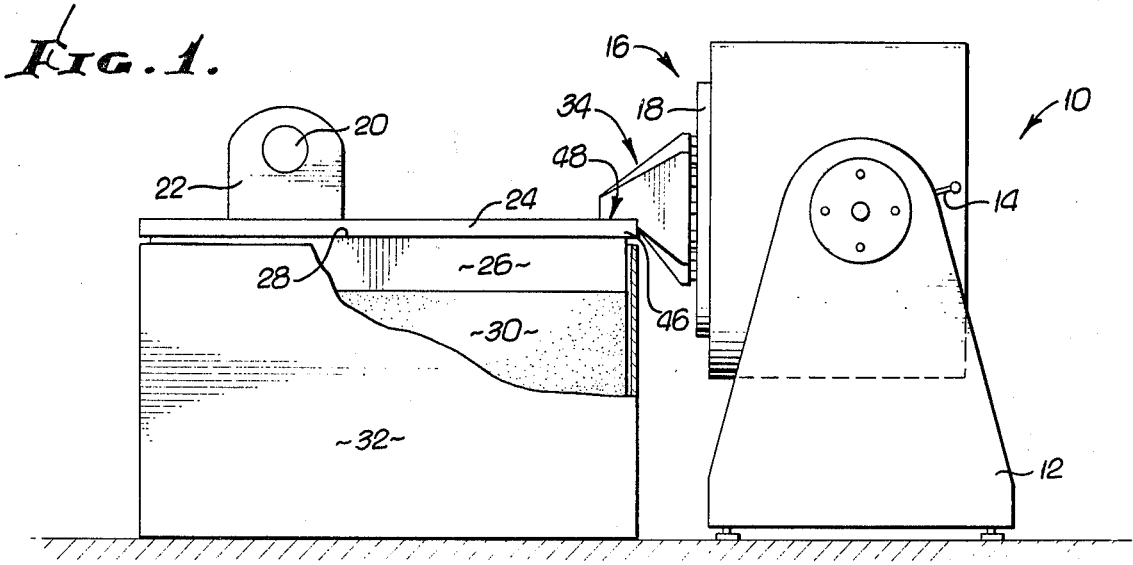
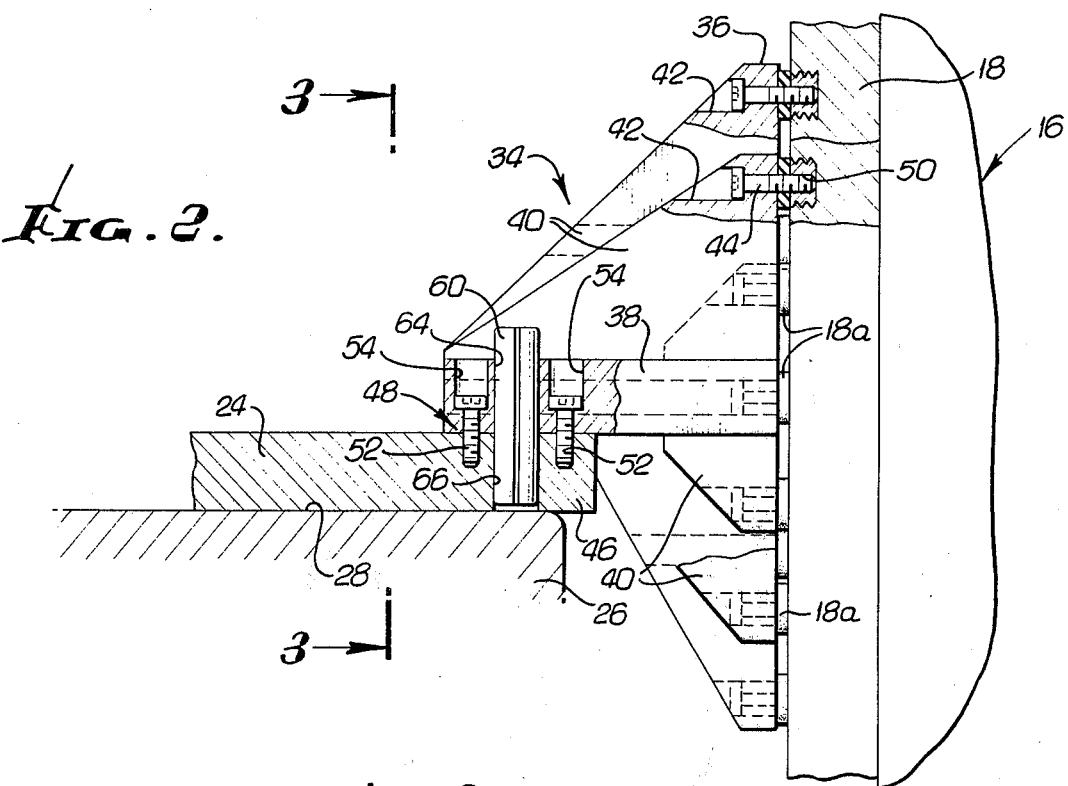
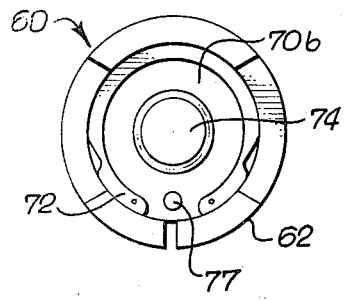
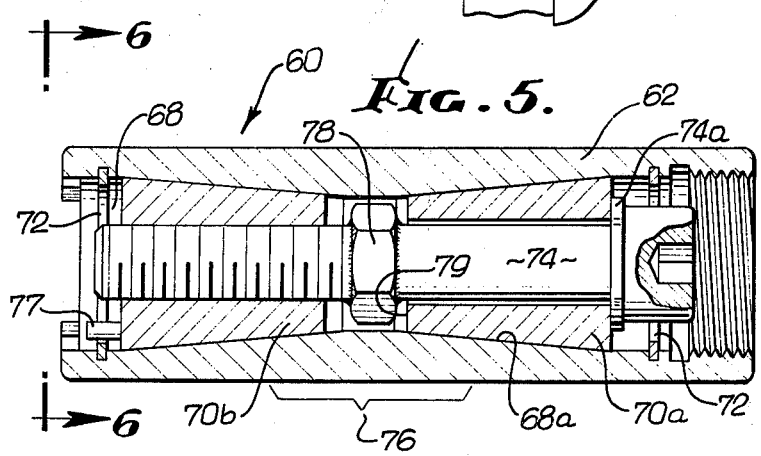

3,933,033

CANTILEVER DRIVER BAR

BACKGROUND OF THE INVENTION

This invention has to do with vibration test apparatus of the type generally employed to evaluate the resistance to shock or vibration failure of test pieces such as electronic and mechanical devices. Such vibration testing apparatus comprising a shaker head, a slip plate and a support block is known. The shaker head typically is pivotally mounted to oscillate in either a horizontal or vertical direction. The shaker head includes a mounting plate to which the slip plate is fastened generally by a plurality of bolts in a vertically and horizontally distributed pattern. Since the slip plate is a square or rectangular sheet of lightweight metal of small thickness relative to the bolt hole pattern in the mounting plate, an interconnecting means, adapted to be secured to the slip plate and to the mounting plate portions of the shaker head, known as a driver bar, is provided.

The invention particularly relates to improvements in the driver bar component of such apparatus enabling a shorter coupling of the shaker head and the slip plate for more faithful transmission of head vibration through slip plate movement to the test piece device. There is accordingly provided a cantilever driver bar attachment of the slip plate to the shaker head which permits the driver bar to extensively overlie the locus of engagement of the slip plate and support block without encroaching on the locus, by virtue of the interconnection being at the upper surface of the slip plate while the locus of support block engagement is at the lower surface of the slip plate.

Moreover, the driver bar, typically mounted for pivoted movement with the shaker head structure, and being free of attachment to the slip plate underside may be readily pivoted out of its plane of attachment to the slip plate for adjustments to the test piece, slip plate or shaker head, without need of horizontal shifting relatively of the shaker head structure and the slip plate.

PRIOR ART

Driver bars in the past have comprised a base member having bolt holes arranged to register with the bolt holes in the shaker head mounting and a U-shaped member into which the slip plate was fitted to be secured by bolts and in some instances expansion pins adapted to transmit force in shear from the driver bar U-member to the slip plate, thus to produce vibratory oscillation of the slip plate and test piece carried thereby. With this arrangement, shifting of the test piece or slip plate relative to the shaker head structure for optimum test conditions, for example, involved, in addition to the unbolting of the slip plate and driver bar, the cumbersome lateral separation of these two components until the slip plate cleared the U-member of the driver bar.

It is accordingly an object of the present invention to provide a shaker head slip plate assembly in which the slip plate adjustment is facile and not cumbersome.

The slip plate is generally supported for free-sliding movement on a support block of granite having an oil-film surface. In previously known vibration test apparatus, the shaker head has been spaced some distance from the slip plate because the lower arm of the drive bar U-member extending under the slip plate interfered with the support block. The driver bars were thus unduly long and vibration transmissions especially at high frequencies were subject to unacceptable losses through the long driver bar.

It is further object of the present invention to provide a close coupling of the slip plate to the shaker head through the use of a short coupling driver bar which overlies the locus of free-sliding engagement of the slip plate and support block for most effective transmission of vibrator oscillation, without incursion into the support block space below the slip plate.

SUMMARY OF THE INVENTION

These and other objects to become apparent hereinafter are realized according to the present invention, in general, in vibration testing apparatus comprising a shaker head carried for high frequency vibration in a horizontal plane, a horizontally disposed slip plate adapted to carry a test piece opposite the shaker head, and a slip plate support block having a locus of free-sliding engagement with the undersurface of the slip plate, in which there is provided, the improvement comprising driver bar means interconnecting the slip plate and shaker head in vibration transmitting relation opposite the support block and freely of said engagement locus.

The apparatus typically will include a driver bar means which comprises a base adapted for attachment to the shaker head and a flange adapted for attachement to the slip plate. The base is normally vertically disposed and the flange normally horizontally disposed. The base defines plural fastening means distributed horizontally and above and below the horizontal plane of the flange for fastening together the driver bar base and the shaker head. The driver bar flange defines plural fastening means adapted for fastening the flange to the slip plate. The apparatus may typically further comprise the driver bar being pivotally supported for movement relative to the slip plate and vertically disposed pin means transmitting force in shear between the driver bar and the slip plate.

In specific preferred forms of the apparatus the driver bar base fastening means are arranged to register with fastening means on the shaker head, the driver bar flange projects normally from the bar base intermediate the base fastening means and is provided with fastening means adapted to register with the slip plate fastening means. Generally the flange and slip plate are apertured in registered relation, and the apparatus further includes pin means extending through the registered apertures to couple the driver bar flange and slip plate in vibration transmitting relation, the pins having radial expansibility to tightly engage the apertures.

BRIEF DESCRIPTION OF THE DRAWINGS

The invention will be further described as to an illustrative embodiment in connection with the attached drawing in which:

FIG. 1 is an elevational side view, partly broken away to show underlying parts of the vibration test apparatus according to the invention;

FIG. 2 is a view in vertical section of the driver bar of the present invention attached to the shaker head structure and supporting the slip plate in cantilever relation;

FIG. 5 is an enlarged detail view of the expansible pin connection shown in FIG. 2; and FIG. 6 is an end view of the expansible pin of FIG. 5 taken on line 6—6 in FIG. 5.

DESCRIPTION OF THE PREFERRED EMBODIMENT

Figure 3:
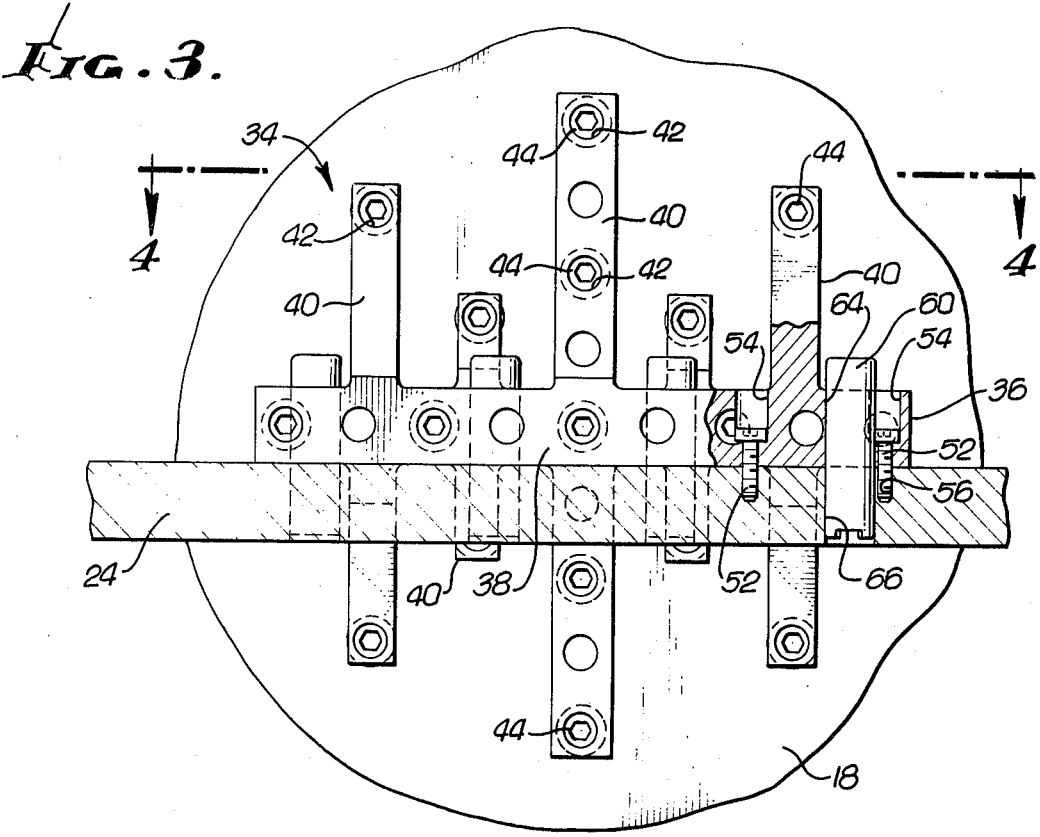
FIG. 3 is a view taken on line 3—3 in FIG. 2.
Figure 4:
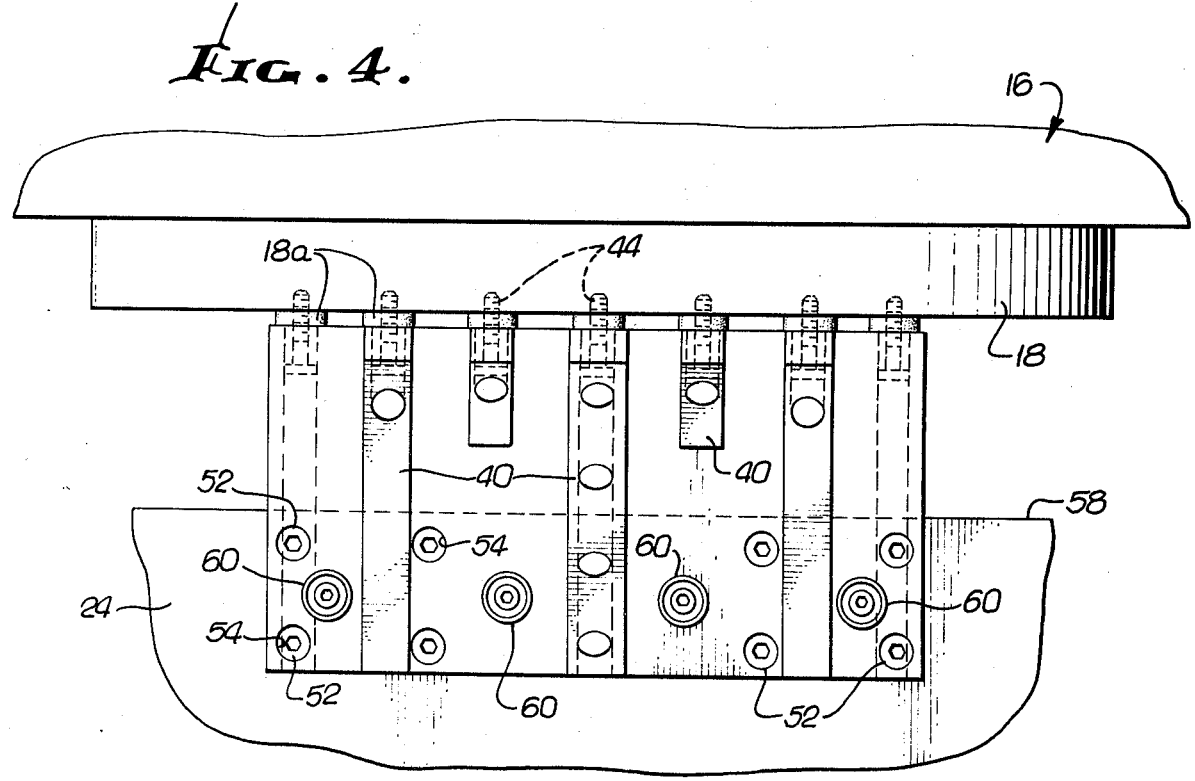
FIG. 4 is a view taken on line 4—4 in FIG. 3.

Referring now to the drawings in detail, and particularly with reference to FIG. 1, a vibration shaker test apparatus is shown including an illustrative vibration shaker 10 carried for pivoted movement between horizontal and vertical dispositions on frame 12 controlled by handle 14. Shaker apparatus 10 includes a shaker head generally indicated at 16 at which a mounting plate 18 is secured for vibration oscillation by the shaker apparatus. The test piece to be subjected to vibration is shown at 20 secured in fixture 22 which in turn is fastened to the slip plate 24, a horizontally disposed generally rectangular sheet of lightweight but strong material such as magnesium metal. The slip plate 24 rests upon horizontal granite support block 26 having a highly smoothed surface and on which an oil film (not shown) is deposited to provide minimum friction at the locus 28 of engagement between the slip plate and the support block. The support block 26 is maintained at the desired elevation by concrete pedestal 30 or other suitable means, the assembly of pedestal and support block being enclosed within a suitable metal housing 32.

Thusfar described the vibration test device comprising a vibration producing member, the vibration shaker 10, and the slip plate 24 which with the support block 26 and fixture 22 holds the test piece 20 ready for oscillatory vibration as determined by the shaker vibrations.

As will be evident and as noted above, it is essential to couple the slip plate 24 to the shaker apparatus and for this purpose a driver bar, generally indicated at 34 is employed. While driver bars have been used in the past, the illustrated driver bar is new in configuration and because of its single side engagement with the slip plate, highly advantageous in use. Considering the driver bar 34 then, in FIGS. 1 and 2 particularly, it will be observed that the driver bar includes a base portion 36 and a flange portion 38. The base 36 is normally vertically disposed (as shown) and the flange is normally horizontally disposed (also as shown). The driver bar base 36 is parallel with and fastened to the mounting plate 18 of the shaker head 16, while the driver bar flange 38 is parallel with the slip plate 24, normal to the base 36 and mounting plate. A series of essentially triangular vertical ribs 40 of decreasing height outwardly from driver bar center to the bar sides braces the flange 38 and base 36 of the bar 34 and define fastener means in the form of bolt holes 42 for bolts 44.

The function of the driver bar 34 is to transmit vibrational energy with as little loss as possible from the shaker head 16 to the test piece 20 through the slip plate 24 and fixture 22. For this purpose, the driver bar configuration of the invention has been devised which is readily formed of a suitable metal and which is effective and uniquely advantageous in use. Specifically the bar flange 38 is unitary and positioned to only overlie the slip plate 24. There is no corresponding flange-like element below the slip plate 24. This enables the shaker head 16 and the base 36 of the driver bar 34 to be relatively closer to the support block 26, thus reducing the unsupported extent 46 of slip plate beyond the engagement locus 28 of the slip plate and the support block to less than that found when the slip plate is held in the U-shaped member of a driver bar according to the prior art. Moreover, the flange 36 actually overlies a portion 48 of engagement locus 28 further contributing to the faithfulness of vibration transmission and to the heightening of the validity of test results obtained.

The shaker head mounting plate 18 defines a series of fastener openings being suitably threaded apertures 50 distributed vertically and horizontally across the extent of the mounting plate. The corresponding bolt holes 42 or other suitable fastening means provided in the driver bar base 36 and extending through ribs 40 (See FIGS. 2 and 3) register with the tapped mounting plate openings 50 and permit insertion of bolts 44 through the bolt holes and into the plate openings. It will be noted that the bolt pattern in the driver bar 34 is extended above and below the slip plate 24 vertical extent to fully utilize the mounting plate openings and maximize the extent of connection of the driver bar to the shaker apparatus 10, in spaced relation by spacers 18a.

The driver bar 34 further is secured to the slip plate 24 in vibration transmitting relation by a plurality of bolts 52 extending through bolt holes 54 in the bar flange 38 and seated in tapped openings 56 in the slip plate 24. As with the base bolts 44, the flange bolts 52 are widely distributed across the width of the slip plate and inward from the plate edge 58 a suitable distance.

In addition to the flange bolts 52, there is provided a series of expansion pins 60 best shown in FIGS. 2 and 3 which serve to better transmit shaker head vibration through the driver bar 34 to the slip plate 24. As best shown in FIGS. 2, 5 and 6 expansion pins 60 each comprise a split sleeve 62 terminally internally threaded for ease of insertion and removal and adapted to interfit registered pin openings 64 and 66 in the bar flange 38 and slip plate 24 respectively. Within the sleeve 62 a central bore 68 is provided tapering inwardly from opposite ends of the latter sleeve defining a cam surface 68a. A pair of annular beveled bearings 70a and 70b, carrying anti-rotation pin 77 are seated within the sleeve in opposed relation and loosely captured by lock rings 72, a flanged bolt 74, having flange 74a, passing therethrough. Bolt 74 threadedly engages wedge 70a whereby clockwise rotation of the bolt draws bearings 70a and 70b together forcing sleeve 62 to expand diametrically at 76, intermediate its length. When thus expanded, pins 60 are tightly fitted in pin openings 64, 66, and more effectively than bolts 52 transmit shaker head 16 vibrations from the driver bar 34 to the slip plate 24 and thus to the test piece 20 carried thereby. On counterrotation integral nut 78 on bolt 74 acts on shoulder 79 of bearing 70a to relieve diametric pressure on the sleeve.

The positioning of the slip plate 24 may be readily effected without lateral shifting of the shaker apparatus 10 or disassembly of driver bar 34 from the shaker head 16 by unbolting the slip plate from the driver bar and pivoting the shaker apparatus on frame 12 upward to clear the driver bar flange 38 from the slip plate, to be returned to its normal horizontal disposition following slip plate adjustment. Of course, the apparatus 10 may be used with the slip plate vertically disposed, should the test piece or test procedure so require, the shaker apparatus then acting to provide underlying support in the manner of the support block.

I claim:

1. In vibration testing apparatus comprising a shaker head carried for high frequency vibration in a horizontal plane, a horizontally disposed slip plate adapted to carry a test piece opposite the shaker head, and a slip plate support block having a planar locus of free sliding engagement with the undersurface of the slip plate; the improvement comprising driver bar means interconnecting said slip plate and shaker head in vibration transmitting relation opposite said support block, said driver bar means comprising a normally vertically disposed base attached to said shaker head and a normally horizontally disposed flange attached to said slip plate, and freely of the plane of said engagement locus; said base defining plural fastening means distributed horizontally and above and below the plane of said flange for fastening together the driver bar base and said shaker head, and said flange defining plural distributed fastening means for fastening said flange to said slip plate.

2. The vibration testing apparatus according to claim 1 including also vertically disposed bodily removable pin means transmitting force in shear between said driver bar and said slip plate.

3. The vibration testing apparatus according to claim 1 in which said driver bar means is pivotally supported for movement relative to said slip plate.

4. The vibration testing apparatus according to claim 3 in which said shaker head is provided with plural distributed fastening means, and said driver bar includes a base defining plural fastening means arranged to register with said shaker head fastening means.

5. The vibration testing apparatus according to claim 4 in which said slip plate has plural distributed fastening means, and said driver bar flange has plural fastening means adapted to register with said slip plate fastening means.

6. The vibration testing apparatus according to claim 5 in which said flange and slip plate are apertured in registered relation and including also removable pin means extending through said registered apertures to couple said driver flange and said slip plate in vibration transmitting relation, said pin having thread adjustable radial expansibility to tightly engage or relieve pressure on said apertures.

* * * * *